(12) United States Patent
Yeom et al.

(10) Patent No.: US 11,631,874 B2
(45) Date of Patent: Apr. 18, 2023

(54) SYSTEM AND METHOD FOR CONTROLLING FUEL CELL

(71) Applicants: HYUNDAI MOTOR COMPANY, Seoul (KR); KIA CORPORATION, Seoul (KR)

(72) Inventors: Sang Chul Yeom, Yongin-si (KR); Jeong Kyu Park, Yongin-si (KR); Jae Hwan Choi, Cheonan-si (KR); Sae Byeok Seung, Yongin-si (KR); Hyo Jun Kim, Gunpo-si (KR); Jae Hoon Jeong, Seoul (KR); Dong Hoon Kim, Seoul (KR); Seung Yoon Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 86 days.

(21) Appl. No.: 17/411,516

(22) Filed: Aug. 25, 2021

(65) Prior Publication Data

US 2022/0158205 A1 May 19, 2022

(30) Foreign Application Priority Data

Nov. 19, 2020 (KR) .................. 10-2020-0155690

(51) Int. Cl.
*H01M 8/04* (2016.01)
*H01M 8/04858* (2016.01)
*H01M 8/04537* (2016.01)

(52) U.S. Cl.
CPC ..... *H01M 8/04902* (2013.01); *H01M 8/0488* (2013.01); *H01M 8/0491* (2013.01); *H01M 8/04559* (2013.01); *H01M 8/04589* (2013.01); *H01M 2250/20* (2013.01)

(58) Field of Classification Search
CPC ......... H01M 8/04902; H01M 8/04559; H01M 8/04589; H01M 8/0488; H01M 8/0491
USPC ......................................... 429/431
See application file for complete search history.

(56) References Cited

U.S. PATENT DOCUMENTS

| 7,473,479 | B2* | 1/2009 | Igarashi | H01M 8/04552 700/297 |
| 2013/0288148 | A1* | 10/2013 | Kazuno | H01M 8/04619 429/444 |
| 2017/0203665 | A1* | 7/2017 | Lee | B60L 58/40 |

FOREIGN PATENT DOCUMENTS

KR 2018-0126126 A 11/2018

* cited by examiner

*Primary Examiner* — James M Erwin
(74) *Attorney, Agent, or Firm* — McDonnell Boehnen Hulbert & Berghoff LLP

(57) ABSTRACT

Disclosed are a control system for a fuel cell including a fuel cell configured to receive a fuel gas and an oxidation gas and generate electric power, a current controller configured to control an output current output from the fuel cell, based on a demanded current of the fuel cell, while maintaining an output voltage output from the fuel cell at a preset voltage or more, and a restriction controller configured to estimate an output current at the preset voltage as a maximum current when the output voltage of the fuel cell drops to become equal to or smaller than the preset voltage, and restrict the output current of the fuel cell to not more than a first restriction current set based on the estimated maximum current, and a control method for a fuel cell.

15 Claims, 6 Drawing Sheets

SYSTEM AND METHOD FOR CONTROLLING FUEL CELL

CROSS REFERENCE TO RELATED APPLICATIONS

This application claims the priority benefit of Korean Patent Application No. 10-2020-0155690, filed on Nov. 19, 2020, in the Korean Intellectual Property Office, the disclosure of which is incorporated herein by reference.

BACKGROUND

1. Field

The present disclosure relates to a system and a method for controlling a fuel cell and, more specifically, to power control regarding a fuel cell stack for improving the driving stability of a fuel cell vehicle.

2. Description of the Prior Art

A fuel cell is a kind of power generation device configured to directly convert chemical energy resulting from oxidation of fuel into electric energy. The fuel cell is similar to a chemical cell in that an oxidation/reduction reaction is utilized, but is different from the chemical cell, in which a cell reaction proceeds within a closed system, in that reaction materials are continuously supplied from the outside, and reaction resultants are continuously removed out of the system. Fuel cell power generation systems have recently been put to practical use, and there has been extensive research to use the same as eco-friendly vehicle energy sources because the reaction resultants in fuel cells are pure water.

A fuel cell system includes a fuel cell stack for generating electric energy through a chemical reaction, an air supply device for supplying air to the air electrode of the fuel cell stack, and a fuel supply device for supplying fuel to the hydrogen electrode of the fuel cell stack. That is, air including oxygen is supplied to the air electrode (cathode) of the fuel cell stack, and hydrogen is supplied to the hydrogen electrode (anode) of the fuel cell stack.

In the case of a fuel cell system, the voltage decreases as the current increases according to a current-voltage (I-V) curve. The I-V curve gradually moves downwards as degradation of the fuel cell stack proceeds. As a result, the voltage gradually decreases when the same current is output.

In the case of a fuel cell system according to the prior art, the voltage of the fuel cell decreases and reaches a lower-limit voltage or less as the current output from the fuel cell abrupt increases. As a result, the current output from the fuel cell is restricted. However, this poses a problem in that the current is frequently restricted in this manner, thereby degrading the driving stability of the vehicle equipped with the fuel cell.

The above descriptions regarding background arts are only for helping understanding of the background of the present disclosure, and are not to be considered by a person skilled in the art as corresponding to already-known prior arts.

SUMMARY

The present disclosure has been proposed in order to solve the above-mentioned problems, and an aspect of the present disclosure is to provide a system and a method for controlling electric power of a fuel cell while varying the reference for restricting the output current.

A control system for a fuel cell according to the present disclosure may include a fuel cell configured to receive a fuel gas and an oxidation gas and generate electric power, a current controller configured to control an output current output from the fuel cell, based on a demanded current of the fuel cell, while maintaining an output voltage output from the fuel cell at a preset voltage or more, and a restriction controller configured to estimate an output current at the preset voltage as a maximum current when the output voltage of the fuel cell drops to become equal to or smaller than the preset voltage, and restrict the output current of the fuel cell to not more than a first restriction current set based on the estimated maximum current.

The restriction controller may control the current controller to restrict the output currents to not more than a first restriction current when the output voltage of the fuel cell drops to become equal to or smaller than the preset voltage not less than a preset number of times, and may estimate an average current value corresponding to an average value of the output currents at the preset voltage according to the preset number of times as the maximum current.

The restriction controller may set a value obtained by applying a factor of less than 1 to the estimated maximum current as a first restriction current.

The restriction controller may restrict the output current of the fuel cell when the output voltage of the fuel cell drops to become equal to or smaller than the preset voltage while the demanded current or the output current of the fuel cell abruptly increases at not less than a preset change rate.

The restriction controller may restrict the output current of the fuel cell to not more than a second restriction current set to be higher than a first restriction current, when the output current of the fuel cell continues for not less than a period of time that is set in advance such that the output current of the fuel cell includes the first restriction current or the demanded current of the fuel cell continues for not less than the period of time that is set in advance to not less than the output current of the fuel cell.

The second restriction current may be set to the magnitude of the output current that is output by the fuel cell at the preset voltage in a state in which the output of the fuel cell is stable.

The state in which the output of the fuel cell is stable may be a state in which the demanded current or the output current of the fuel cell continues at not more than a preset change rate.

The restriction controller may restrict the output current of the fuel cell to not more than the first restriction current again when the demanded current or the output current of the fuel cell continues at not more than a stable current obtained by applying a factor of less than 1 to the second restriction current for not less than a preset period of time in a state in which the output current of the fuel cell is restricted to not more than the second restriction current.

A control method for a fuel cell according to the present disclosure may include controlling an output current output from the fuel cell, based on a demanded current of the fuel cell, while maintaining an output voltage output from the fuel cell at not less than a preset voltage, estimating the output current at a preset voltage as a maximum current when the output voltage of the fuel cell drops to become equal to or smaller than the preset voltage, and restricting the output current of the fuel cell to not more than a first restriction current that is set based on the estimated maximum current.

The estimating of the maximum current may include estimating a current value corresponding to an average value of the output currents at the preset voltage according to the preset number of times as the maximum current. The restricting of the output current may include restricting the output currents of the fuel cell when the output voltage of the fuel cell drops to become equal to or smaller than the preset voltage not less than a preset number of times.

The restricting of the output current may include setting a value obtained by applying a factor of less than 1 to the estimated maximum current as a first restriction current.

The control method may further include before the restricting of the output current, determining whether the demanded current or the output current of the fuel cell abruptly increases at not less than a preset change rate. The restricting of the output current may include restricting the output current of the fuel cell when the output voltage of the fuel cell drops to become equal to or smaller than the preset voltage while the demanded current or the output current of the fuel cell abruptly increases not less at a preset change rate.

The restricting of the output current may include restricting the output current of the fuel cell to not more than a second restriction current set to be higher than a first restriction current, when the output current of the fuel cell continues for not less than a period of time that is set in advance within a preset restriction section such that the output current of the fuel cell includes the first restriction current or the demanded current of the fuel cell continues for not less than the period of time that is set in advance to the output current of the fuel cell or more.

The second restriction current may be set to the magnitude of the output current that is output by the fuel cell at the preset voltage in a state in which the output of the fuel cell is stable.

The restricting of the output current may include restricting the output current of the fuel cell to not more than the first restriction current again when the demanded current or the output current of the fuel cell continues at not more than a stable current obtained by applying a factor of less than 1 to the second restriction current for not less than a preset period of time in a state in which the output current of the fuel cell is restricted to not more than the second restriction current.

A system and a method for controlling a fuel cell according to the present disclosure are advantageous in that it is possible to prevent restriction in the torque of the driving device, fluctuation, or the like, which may occur when the output current is instantaneously restrained to control the output voltage of the fuel cell to not less than a present voltage.

BRIEF DESCRIPTION OF THE FIGURES

The above and other aspects, features, and advantages of the present disclosure will be more apparent from the following detailed description taken in conjunction with the accompanying drawings, in which.

DETAILED DESCRIPTION

Figure 1:
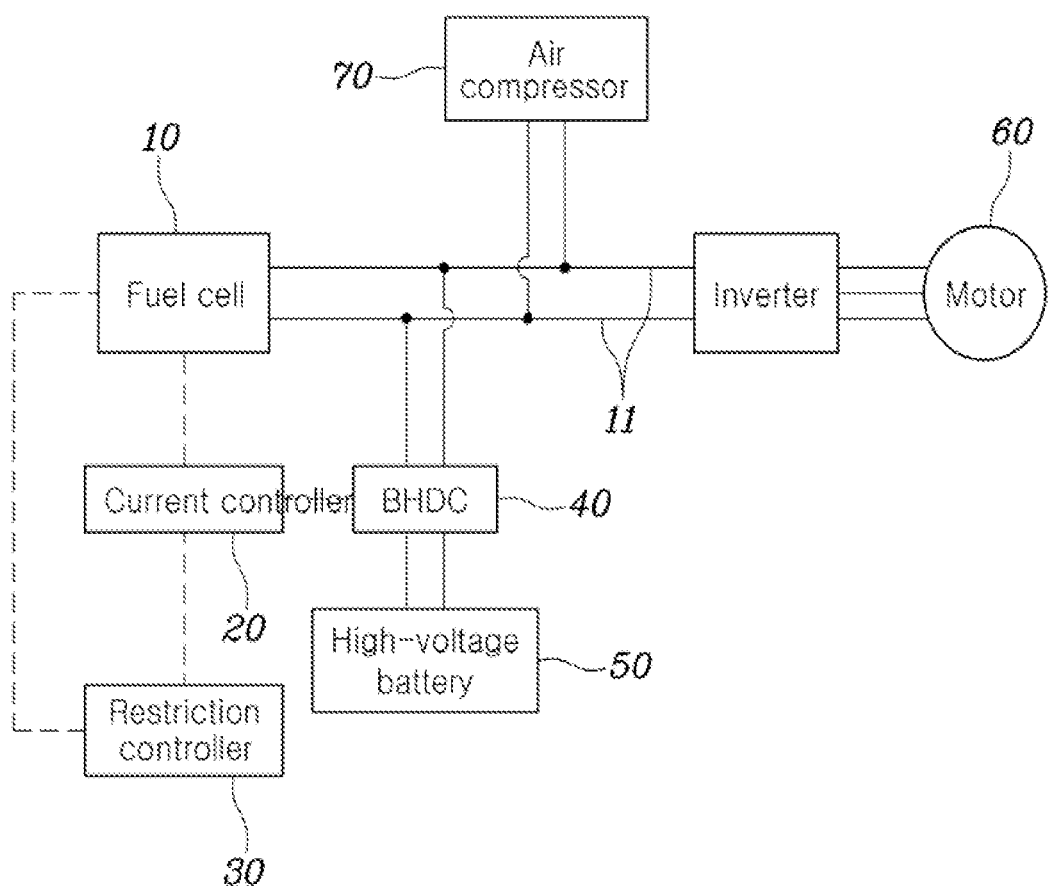
FIG. 1 is a diagram of a control system for a fuel cell according to an embodiment of the present disclosure.

A specific structural or functional description of embodiments of the present disclosure disclosed in the specification or application is given merely for the purpose of describing the embodiment according to the present disclosure. Therefore, the embodiments according to the present disclosure may be implemented in various forms, and the present disclosure should not be construed as being limited to the embodiments described in the specification or application.

Various changes and modifications may be made to the embodiments according to the present disclosure, and therefore particular embodiments will be illustrated in the drawings and described in the specification or application. However, it should be understood that embodiments according to the concept of the present disclosure are not limited to the particular disclosed embodiments, but the present disclosure includes all modifications, equivalents, and alternatives falling within the spirit and scope of the present disclosure.

Such terms as "a first" and/or "a second" may be used to describe various elements, but the elements should not be limited by these terms. These terms are intended merely to distinguish one element from other elements. For example, a first element may be named a second element and similarly a second element may be named a second element without departing from the scope of protection of the present disclosure.

In the case where an element is referred to as being "connected" or "accessed" to other elements, it should be understood that not only the element is directly connected or accessed to the other elements, but also another element may exist between them. Contrarily, in the case where a component is referred to as being "directly connected" or "directly accessed" to any other component, it should be understood that there is no component therebetween. The other expressions of describing a relation between structural elements, i.e. "between" and "merely between" or "neighboring" and "directly neighboring", should be interpreted similarly to the above description.

The terms used in the present disclosure are merely used to describe specific embodiments, and are not intended to limit the present disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure.

Hereinafter, in order to describe the present disclosure in detail, preferred embodiments of the present disclosure will be described with reference to the accompanying drawings. The same reference numerals suggested in the drawings denote the same members.

Figure 2:
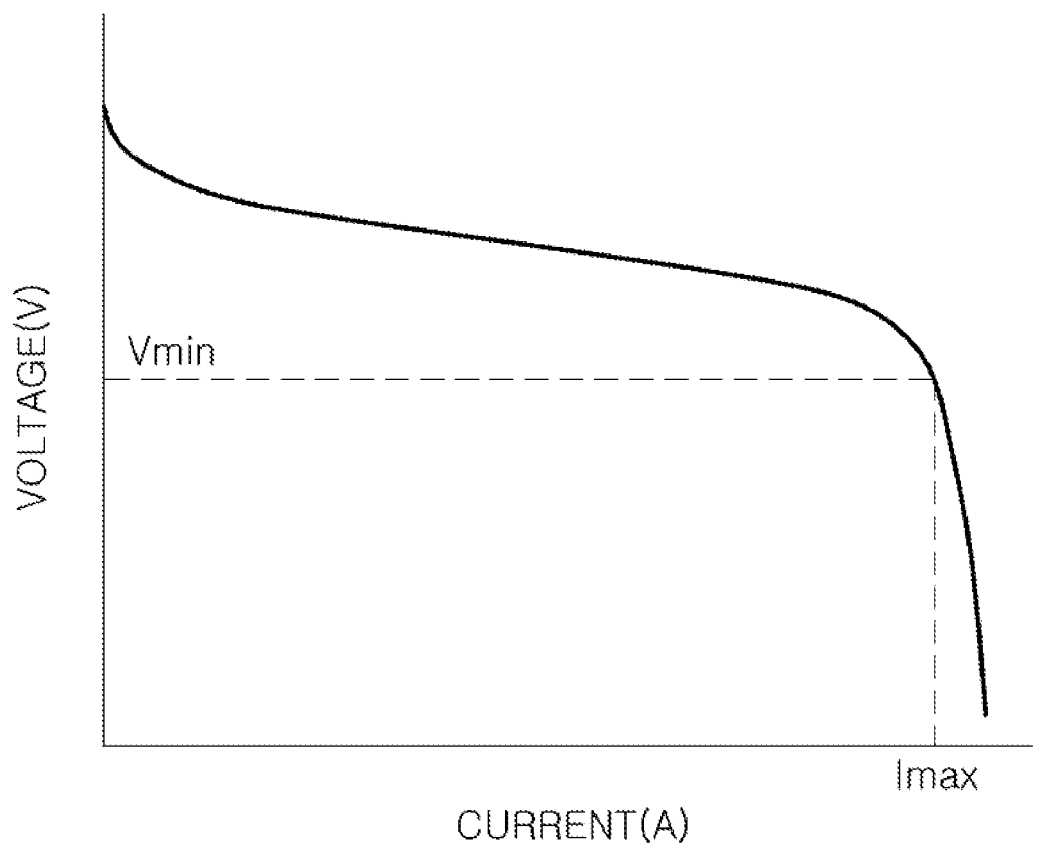
FIG. 2 is a graph depicting a current-voltage (I-V) curve according to the embodiment of the present disclosure.
Figure 3:
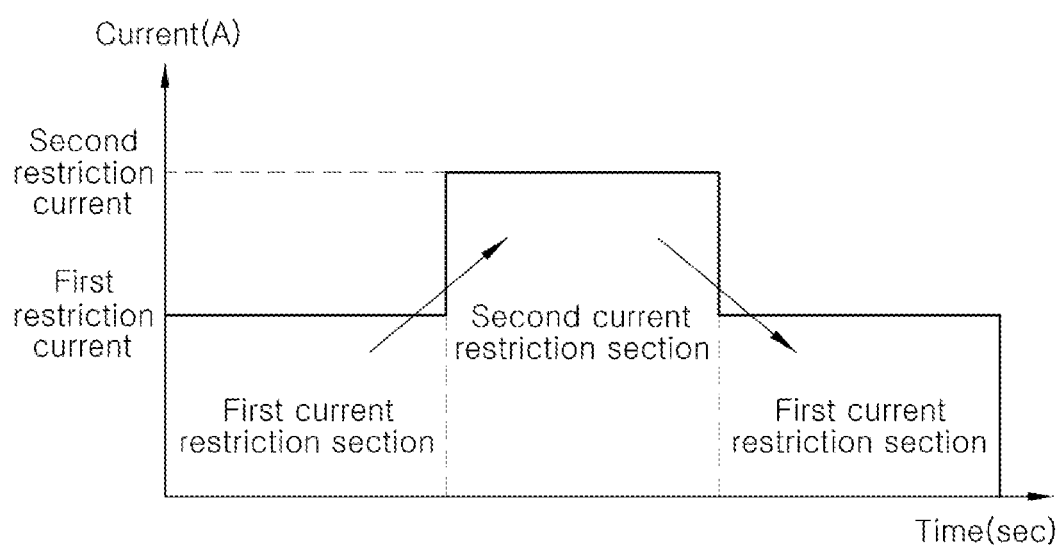
FIG. 3 is a graph depicting a restriction current of the control system for a fuel cell according to the embodiment of the present disclosure.

FIG. 1 is a diagram of a control system for a fuel cell 10 according to an embodiment of the present disclosure. FIG. 2 is a graph depicting a current-voltage (I-V) curve according to the embodiment of the present disclosure. FIG. 3 is a graph depicting a restriction current of the control system for a fuel cell 10 according to the embodiment of the present disclosure.

Referring to FIGS. 1 to 3, a control system for a fuel cell 10 according to an embodiment of the present disclosure includes a fuel cell 10 configured to receive a fuel gas and an oxidation gas and generate electric power, a current controller 20 configured to control an output current output from the fuel cell 10, based on a demanded current of the fuel cell 10, while maintaining an output voltage output from the fuel cell 10 at a preset voltage or more, and a restriction controller 30 configured to estimate an output current at the preset voltage as a maximum current when the output voltage of the fuel cell 10 drops to become equal to or smaller than the preset voltage, and restrict the output current of the fuel cell 10 to not more than a first restriction current set based on the estimated maximum current.

A current controller 20 and a restriction controller 30 according to an exemplary embodiment of the present disclosure may be implemented by an algorithm configured to control operations of various elements of the vehicle, a nonvolatile memory (not illustrated) configured to store data on a software instruction for reproducing the algorithm, and a processor (not illustrated) configured to perform an operation, which will be described below, by using the data stored in the memory. Here, the memory and the processor may be implemented by individual chips. Alternatively, the memory and the processor may be implemented by an integrated single chip. The processor may take the form of one or more processors.

The fuel cell 10 may refer to a fuel cell stack comprised of a plurality of cells. The fuel cell 10 may receive a fuel gas and an oxidation gas through an anode and a cathode, respectively.

In detail, the fuel cell 10 may receive hydrogen that is a fuel gas through the anode and may receive air containing oxygen that is an oxidation gas through the cathode. In particular, in the fuel cell 10, the air compressed by an air compressor 70, which will be described below, may be supplied to the cathode.

The fuel cell 10 may be connected to a driving device 60 including a motor, a balance-of-plant (BOP) including the air compressor 70, and a high-voltage battery 50. In detail, electric power generated by the fuel cell 10 may be supplied to the driving device 60, the balance-of-plant, and the high-voltage battery 50 through a main bus terminal 11.

The air compressor 70 and the motor are electrically connected to the main bus terminal 11, and the electric power provided by the fuel cell 10 and the high-voltage battery 50 may be supplied. The high-voltage battery 50 may be charged by the electric power generated by the fuel cell 10, or may be discharged to assist the electric power generated by the fuel cell 10.

The voltage of the main bus terminal 11 may be changed by a bidirectional high-voltage DC/DC converter 40 (BHDC) located between the fuel cell 10 and the high-voltage battery 50 or between the main bus terminal 11 and the high-voltage battery 50.

The current controller 20 may control an output current that is output from the fuel cell 10, based on a demanded current of the fuel cell 10. The demanded current of the fuel cell 10 may be set by a high-rank controller (for example, a fuel cell control unit (FCU)), and the current controller 20 may control the output current of the fuel cell 10 by controlling the BHDC 40, based on the input demanded current of the fuel cell 10.

In detail, the demanded current of the fuel cell 10 may be set by demanded currents and demanded power of the driving device 60 and the balance-of-plant connected to the fuel cell 10, and may be set as the state of charge (SoC) of the high-voltage battery 50 is reflected.

In addition, the current controller 20 may control the output current of the fuel cell 10 such that the output voltage of the fuel cell 10 is maintained at not less than preset voltage.

Here, the preset voltage may be set in advance in consideration of the rated voltage of the balance-of-plant or the driving device 60 connected to the main bus terminal 11, and may be set in advance to a voltage that may secure an operation of the balance-of-plant or the driving device 60.

As illustrated in FIG. 2, the output voltage of the fuel cell 10 has a relationship that is inversely proportional to the output current, and tends to decrease as the output current increases. Accordingly, the magnitude of the output current of the fuel cell 10 may be restricted not to increase further to maintain the output voltage of the fuel cell 10 at not less than the preset voltage.

Additionally, because the current-voltage curve of the fuel cell 10 tends to gradually decrease due to the deterioration of the fuel cell 10, the output voltage of the fuel cell 10 may gradually decrease in a state in which the output voltage is the preset voltage.

The restriction controller 30 may restrict the output current of the fuel cell 10 such that the output current of the fuel cell 10 does not increase further, by controlling the current controller 20 or controlling the BHDC 40.

In detail, the restriction controller 30 may restrict the output current of the fuel cell 10 when the output voltage of the fuel cell 10 drops to become equal to or smaller than the preset voltage. The current controller 20 controls the output current of the fuel cell 10 such that the output voltage of the fuel cell 10 becomes not less than the preset voltage, but the output voltage of the fuel cell 10 may decrease to not more than the preset voltage according to a situation, for example, in which the output current of the fuel cell 10 abruptly increases.

The restriction controller 30 may estimate the output current at the preset voltage as a maximum current, and may restrict the output current of the fuel cell 10 to not more than a first restriction current that is set based on the estimated maximum current.

That is, the restriction controller 30 may preemptively apply the restriction of the output current when the current controller 20 controls the output current of the fuel cell 10 as the output voltage of the fuel cell 10 decreases.

Accordingly, restriction in the torque of the driving device or fluctuations of the vehicle that may occur while the output current is instantaneously restrained to control the output voltage of the fuel cell 10 to not less than the present voltage can be prevented.

In an embodiment, the restriction controller 30 controls the current controller 20 such that the output current of the fuel cell 10 is restricted to not more than the first restriction current when the output voltage drops to become equal to or smaller than the preset voltage not less than a preset number of times, and may estimate a current value corresponding to an average value of the output currents at the preset voltage according to the preset number of times.

The preset number of times may be set in advance for the stability of control, and may be set in advance to three times or five times. The restriction controller 30 may control the current controller 20 to restrict the output currents to not more than the first restriction current when the output voltage of the fuel cell 10 drops to become equal to or smaller than the preset voltage not less than the preset number of times.

Further, the restriction controller 30 may estimate a maximum current by using an average current value corresponding to an average value of the output currents at the preset voltage according to the preset number of times. That is, the restriction controller 30 may estimate the maximum current by using an average of the currents, in which the output currents are restricted, as the output voltage of the fuel cell 10 drops to become equal to or smaller than the preset voltage.

The restriction controller 30 may set a value obtained by applying a factor of less than 1 to the estimated maximum current as the first restriction current.

As an embodiment, the factor may be set in advance to a value, such as 0.9 or 0.8, which is smaller than 1.

The restriction controller 30 may apply the factor of less than 1 to the estimated maximum value when the first restriction current is set such that the output current of the fuel cell 10 generates the maximum current, thereby preventing in advance the output voltage from decreasing to not more than the preset voltage.

The restriction controller 30 may restrict the output current of the fuel cell 10 when the output voltage of the fuel cell 10 drops to become equal to or smaller than the preset voltage while the demanded current or the output current of the fuel cell 10 abruptly increases at not less than a preset change rate.

If the demanded power or the demanded current of the fuel cell 10 increases, the electric power generated by the fuel cell 10 increases. The electric power generated by the fuel cell 10 may be proportional to the amount of the air supplied to the fuel cell 10 by the air compressor 70.

That is, the amount of the air supplied to the fuel cell 10 increases as the demanded current of the fuel cell 10 increases, and the rotational speed of the air compressor 70 may increase while the amount of the supplied air increases.

In particular, the rotational speed of the air compressor 70 also abruptly increases when the demanded current or the output current of the fuel cell 10 abruptly increases, and to achieve this, the amount of the currents consumed by the air compressor 70 increases.

In addition, when the demanded current or the output current of the fuel cell 10 abruptly increases, a delay time may occur when the electric power generated by the fuel cell 10 increases even though the amount of the air supplied to the fuel cell 10 increases.

Accordingly, when the demanded current or the output current of the fuel cell 10 abruptly increases, the output voltage of the fuel cell 10 may abruptly drop to become equal to or smaller than the preset voltage even in a state in which the output current is not more than a second restriction current, which will be described below.

Accordingly, the restriction controller 30 may restrict the output current of the fuel cell 10 to not more than the first restriction current when the demanded current or the output current of the fuel cell 10 abruptly increases at not less than the preset change rate.

The restriction controller 30 may restrict the output current of the fuel cell 10 to not more than a second restriction current set to be higher than a first restriction current, when the output current of the fuel cell 10 continues for not less than a period of time that is set in advance within the preset restriction section such that the output current of the fuel cell 10 includes the first restriction current or the demanded current of the fuel cell 10 continues for not less than the period of time that is set in advance to not less than the output current of the fuel cell 10 (a first current restriction section→a second current restriction section).

The present restriction section may be a section that is adjacent to the first restriction current to include the first restriction current. The restriction controller 30 may determine that the output current of the fuel cell 10 is restricted to the first restriction current when the output current of the fuel cell 10 corresponds to the first restriction current or is adjacent to the first restriction current.

In another embodiment, the restriction controller 30 may determine whether the demanded current of the fuel cell 10 continues at not less than the output current of the fuel cell 10. Further, the restriction controller 30 may determine whether the demanded torque of the driving device 60, which is input by the driver according to the pushing degree of an accelerator pedal, continues at not less than the current torque.

That is, the restriction controller 30 may continuously require the demanded current of the fuel cell 10 to be not less than the first restriction current when the output current of the fuel cell 10 is continuously restricted to not more than the first restriction current for not less than a preset period of time. In this case, the restriction controller 30 may restrict the output current of the fuel cell 10 to a second restriction current that is set to be larger than the first restriction current (the first current restriction section→the second current restriction section).

Accordingly, the driving performance of the driving device 60 can be improved by increasing the output current of the fuel cell 10 when the output current of the fuel cell 10 is required to continuously increase in a state in which the output current of the fuel cell 10 is restricted to the first restriction current, and the acceleration performance of the fuel cell vehicle can be secured.

In detail, the second restriction current may be set to a magnitude of the output current that is output by the fuel cell 10 at the preset voltage in a state, in which the output of the fuel cell 10 is stable.

That is, the second restriction current may be the output current of the fuel cell 10 corresponding to the preset voltage in a current-voltage curve of the fuel cell 10.

Here, the state, in which the output of the fuel cell 10 is stable, may be a state, in which the demanded current or the output current of the fuel cell 10 is maintained at not more than the preset change rate.

That is, the restriction controller 30 may restrict the output current of the fuel cell 10 to the second restriction current that is larger than the first restriction current not in a situation, in which the demanded current or the output current of the fuel cell 10 abruptly increases, but in a situation, in which the demanded current or the output current of the fuel cell 10 slowly increases.

Additionally, the second restriction current reflects the performance of the fuel cell 10 due to deterioration of the fuel cell 10 or the like, and the second restriction current may decrease while the current-voltage curve of the fuel cell 10 declines as reversible deterioration or irreversible deterioration occurs in the fuel cell 10.

The restriction controller 30 may restrict the output current of the fuel cell 10 to not more than the first restriction current again when the demanded current or the output current of the fuel cell 10 is maintained at not more than a stable current obtained by applying the factor of less than 1 to the second restriction current in a state, in which the output current of the fuel cell 10 is restricted to not more than the second restriction current (the second current restriction section→the first current restriction section).

The stable current may be set by applying the factor of less than 1 to the second restriction current. As an embodiment, the factor may be set to 0.9, 0.8, or the like in advance.

The restriction controller 30 may restrict the output current of the fuel cell 10 to not more than the first restriction current again in a state, in which the output current of the fuel cell 10 is restricted to not more than the second restriction current (the second current restriction section-→the first current restriction section).

In detail, the output current of the fuel cell 10 may be restricted to not more than the first restriction current again when the demanded current or the output current of the fuel cell 10 is maintained at not more than the stable current for not less than the preset period of time (the second current restriction section→the first current restriction section).

In another embodiment, the restriction controller 30 may determine whether the demanded torque of the driving device 60, which is input by the driver through the pushing degree of an accelerator pedal, continues at not more than the current torque. The restriction controller 30 may restrict the output current of the fuel cell 10 to not more than the first restriction current again when the demanded torque of the driving device 60 is maintained at not more than the current torque for not less than the preset period of time in the state, in which the output current of the fuel cell 10 is restricted to not more than the second restriction current.

Additionally, the first restriction current and the second restriction current may be stored in a nonvolatile memory, and may be applied during a restart of the fuel cell 10 after the start-off of the fuel cell 10.

Figure 4:
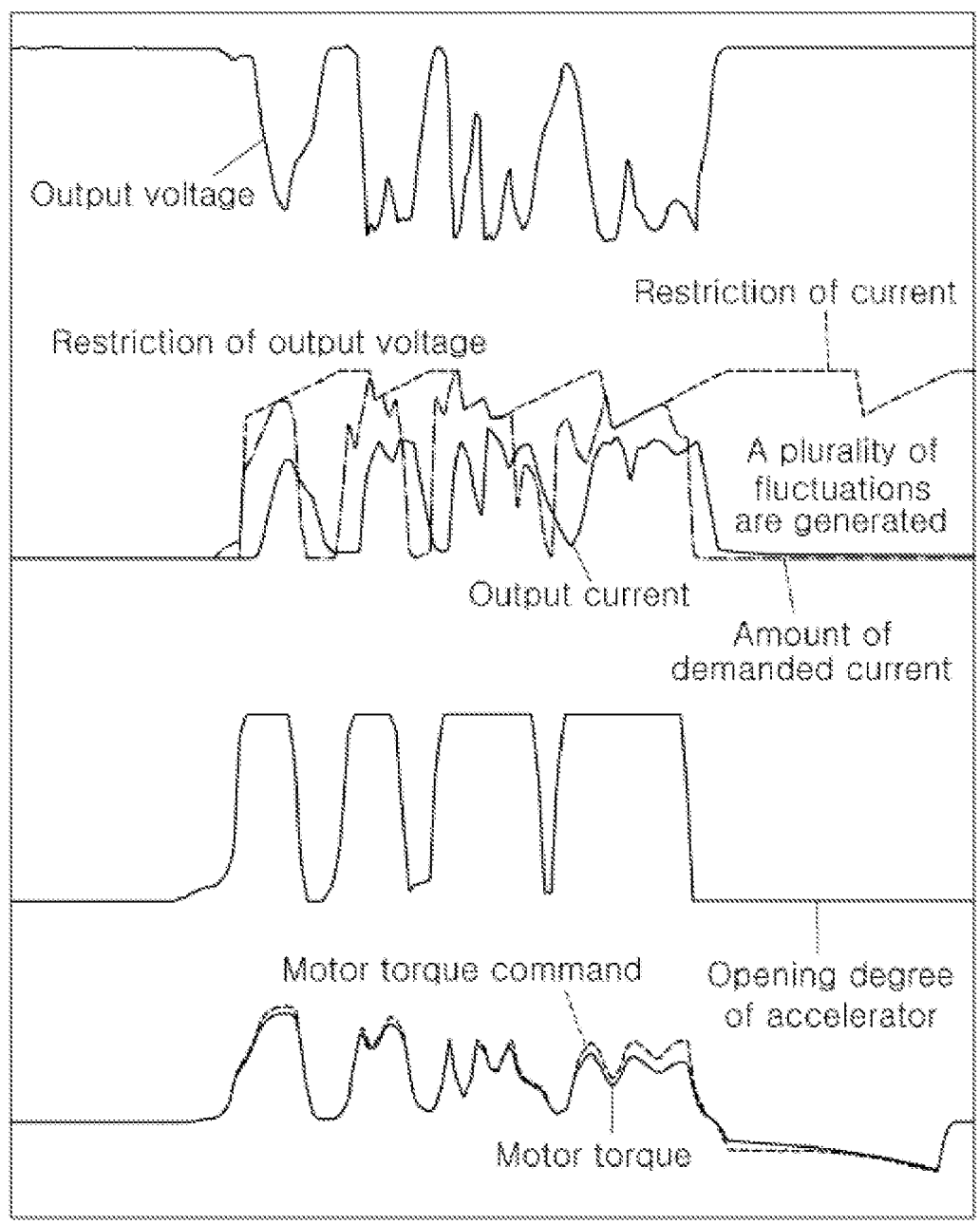
FIG. 4 is a graph depicting an output current and an output voltage of a fuel cell according to the related art.
Figure 5:
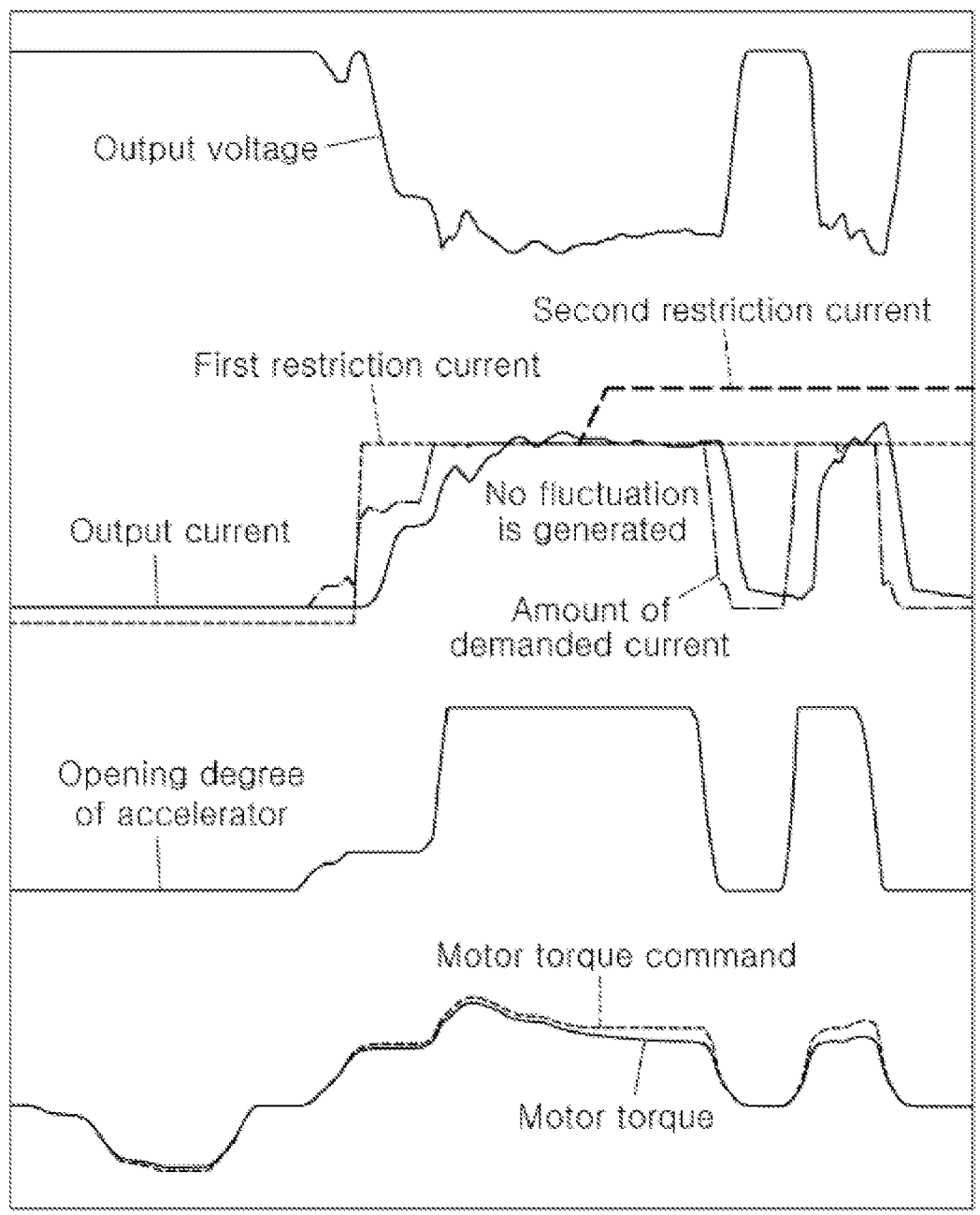
FIG. 5 is a graph depicting an output current and an output voltage of the fuel cell according to the embodiment of the present disclosure.

FIG. 4 is a graph depicting an output current and an output voltage of a fuel cell 10 according to the related art. FIG. 5 is a graph depicting an output current and an output voltage of the fuel cell 10 according to the embodiment of the present disclosure.

Referring further to FIGS. 4 and 5, according to the related art, when the output current of the fuel cell 10 abruptly increases while the opening degree of the accelerator (the accelerator pedal) abruptly increases, the output voltage abruptly decreases. In this case, the output current of the fuel cell 10 is abruptly restrained such that the output voltage of the fuel cell 10 is maintained at not less than a preset voltage.

Accordingly, the output current of the fuel cell 10 abruptly decreases as the output current of the fuel cell 10 is restricted, and accordingly, the vehicle employing the fuel cell 10 fluctuates as the torque of the motor is abruptly changed so that travel stability decreases.

It can be identified that the fluctuations of the vehicle employing the fuel cell 10 is prevented by restricting the output current of the fuel cell 10 to be maintained at not more than the first restriction current as a measure according to the present disclosure.

Figure 6:
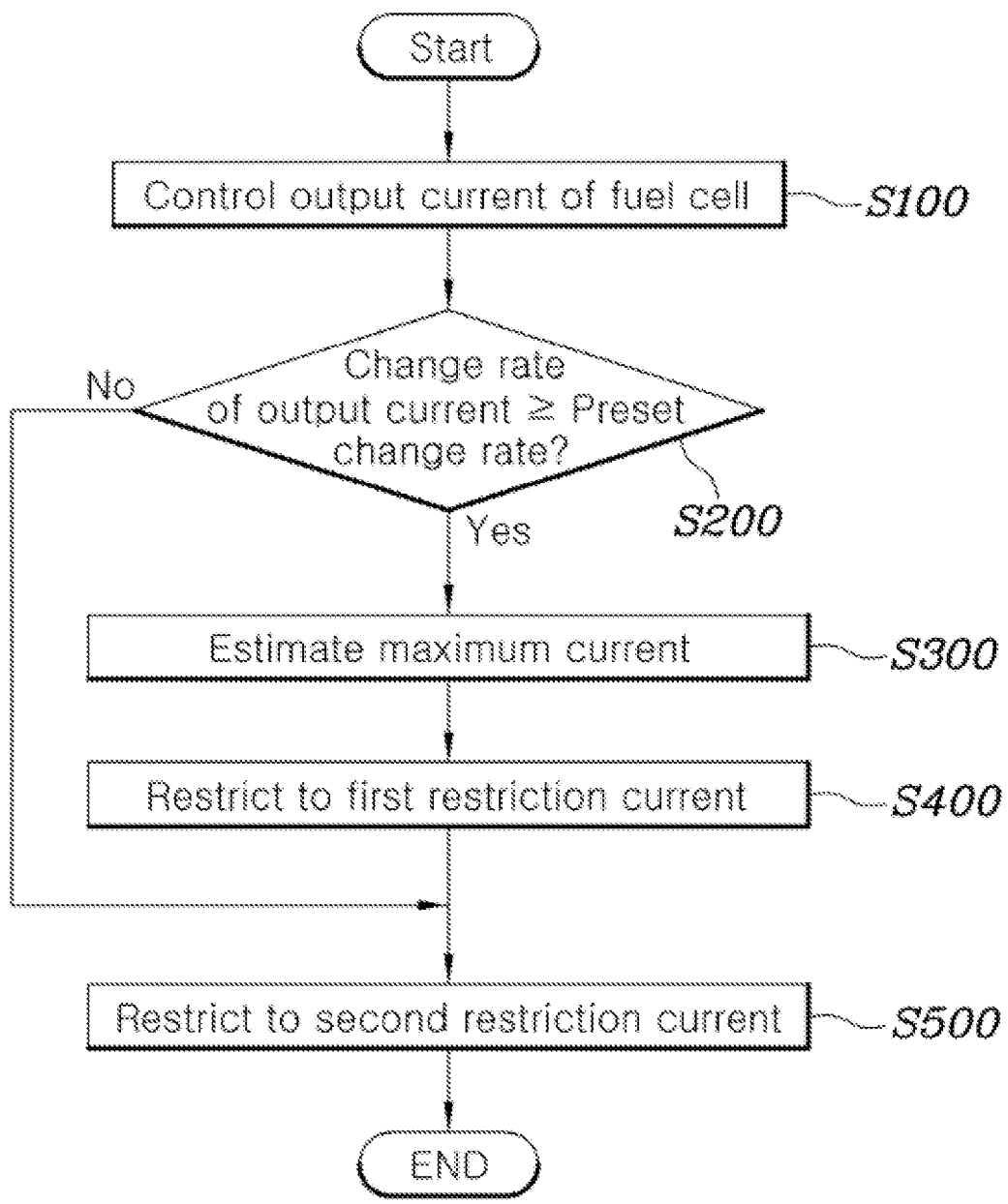
FIG. 6 is a flowchart of a control method for a fuel cell according to an embodiment of the present disclosure.

FIG. 6 is a flowchart of a control method for a fuel cell 10 according to an embodiment of the present disclosure.

Referring further to FIG. 6, a control method for a fuel cell 10 according to an embodiment of the present disclosure includes an operation at S100 of controlling an output current output from the fuel cell 10, based on a demanded current of the fuel cell 10, while maintaining an output voltage output from the fuel cell 10 at not less than a preset voltage, an operation at S300 of estimating the output current at a preset voltage as a maximum current when the output voltage of the fuel cell 10 drops to become equal to or smaller than the preset voltage, and operations at S400 and S500 of restricting the output current of the fuel cell 10 to not more than a first restriction current that is set based on the estimated maximum current.

The operation S300 of estimating the maximum current may include an operation of estimating a current value corresponding to an average value of the output currents at the preset voltage according to the preset number of times as the maximum current, and the operations of S400 and S500 of restricting the output current may include an operation of restricting the output currents of the fuel cell 10 when the output voltage of the fuel cell 10 drops to become equal to or smaller than the preset voltage not less than a preset number of times.

The operation S400 and S500 of restricting of the output current may include an operation (S400) of setting a value obtained by applying a factor of less than 1 to the estimated maximum current as a first restriction current.

The control method may further include, before the operations of S400 and S500 of restricting the output current, an operation at S200 of determining whether the demanded current or the output current of the fuel cell 10 abruptly increases at not less than a preset change rate, and the operations S400 and S500 of restricting the output current may include an operation (S400) of restricting the output current of the fuel cell 10 when the output voltage of the fuel cell 10 drops to become equal to or smaller than the preset voltage while the demanded current or the output current of the fuel cell 10 abruptly increases not less at a preset change rate.

The operations S400 and S500 of restricting the output current may also include an operation (S500) of restricting the output current of the fuel cell 10 to not more than a second restriction current set to be higher than a first restriction current, when the output current of the fuel cell 10 continues for not less than a period of time that is set in advance within the preset restriction section such that the output current of the fuel cell 10 includes the first restriction current or the demanded current of the fuel cell 10 continues for not less than the period of time that is set in advance to the output current of the fuel cell 10 or more.

The second restriction current may be set to a magnitude of the output current that is output by the fuel cell 10 at the preset voltage in a state, in which the output of the fuel cell 10 is stable.

The operations at S400 and S500 of restricting the output current may include an operation (S400) of restricting the output current of the fuel cell to not more than the first restriction current again when the demanded current or the output current of the fuel cell 10 continues at not more than a stable current obtained by applying a factor of less than 1 to the second restriction current for not less than a preset period of time in a state, in which the output current of the fuel cell 10 is restricted to not more than the second restriction current.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

The invention claimed is:

1. A control system for a fuel cell, comprising:
   a fuel cell configured to receive a fuel gas and an oxidation gas, and to generate electric power;
   a current controller configured to control an output current output from the fuel cell based on a demanded current of the fuel cell, while maintaining an output voltage output from the fuel cell at a preset voltage or more; and
   a restriction controller configured to estimate an output current at the preset voltage as a maximum current when the output voltage of the fuel cell drops to become equal to or smaller than the preset voltage, and to restrict the output current of the fuel cell to not more than a first restriction current set based on the estimated maximum current.

2. The control system of claim 1, wherein the restriction controller controls the current controller to restrict the output currents to not more than a first restriction current when the output voltage of the fuel cell drops to become equal to or smaller than the preset voltage for a preset number of times, and estimates an average current value corresponding to an average value of the output currents at the preset voltage according to the preset number of times as the maximum current.

3. The control system of claim 1, wherein the restriction controller sets a value obtained by applying a factor of less than 1 to the estimated maximum current as a first restriction current.

4. The control system of claim 1, wherein the restriction controller restricts the output current of the fuel cell when the output voltage of the fuel cell drops to become equal to or smaller than the preset voltage while the demanded current or the output current of the fuel cell increases at at least a preset change rate.

5. The control system of claim 1, wherein the restriction controller restricts the output current of the fuel cell to not more than a second restriction current set to be higher than a first restriction current, when the output current of the fuel cell continues for a period of time that is set in advance, such that the output current of the fuel cell comprises the first restriction current or the demanded current of the fuel cell continues for at least the period of time that is set in advance to at least the output current of the fuel cell.

6. The control system of claim 5, wherein the second restriction current is set to the magnitude of the output current that is output by the fuel cell at the preset voltage when the output of the fuel cell is stable.

7. The control system of claim 5, wherein the output of the fuel cell is stable when the demanded current or the output current of the fuel cell continues at not more than a preset change rate.

8. The control system of claim 5, wherein the restriction controller restricts the output current of the fuel cell to not more than the first restriction current again when the demanded current or the output current of the fuel cell continues at not more than a stable current obtained by applying a factor of less than 1 to the second restriction current for a preset period of time, in a state in which the output current of the fuel cell is restricted to not more than the second restriction current.

9. A control method for a fuel cell, comprising:
   controlling, by a current controller, an output current output from the fuel cell based on a demanded current of the fuel cell, while maintaining an output voltage output from the fuel cell at at least a preset voltage;
   estimating, by a restriction controller, the output current at a preset voltage as a maximum current when the output voltage of the fuel cell drops to become equal to or smaller than the preset voltage; and
   restricting, by the restriction controller, the output current of the fuel cell to not more than a first restriction current that is set based on the estimated maximum current.

10. The control method of claim 9, wherein the estimating of the maximum current comprises:
    estimating a current value corresponding to an average value of the output currents at the preset voltage according to the preset number of times as the maximum current, and
    wherein the restricting of the output current comprises:
    restricting the output currents of the fuel cell when the output voltage of the fuel cell drops to become equal to or smaller than the preset voltage for at least a preset number of times.

11. The control method of claim 9, wherein the restricting of the output current comprises:
    setting a value obtained by applying a factor of less than 1 to the estimated maximum current as a first restriction current.

12. The control method of claim 9, further comprising:
    before the restricting of the output current, determining whether the demanded current or the output current of the fuel cell increases at at least a preset change rate, and
    wherein the restricting of the output current comprises:
    restricting the output current of the fuel cell when the output voltage of the fuel cell drops to become equal to or smaller than the preset voltage while the demanded current or the output current of the fuel cell increases at at least a preset change rate.

13. The control method of claim 9, wherein the restricting of the output current comprises:
    restricting the output current of the fuel cell to not more than a second restriction current set to be higher than a first restriction current, when the output current of the fuel cell continues for at least a period of time that is set in advance within a preset restriction section, such that the output current of the fuel cell comprises the first restriction current or the demanded current of the fuel cell continues for at least the period of time that is set in advance to the output current of the fuel cell or more.

14. The control method of claim 13, wherein the second restriction current is set to the magnitude of the output current that is output by the fuel cell at the preset voltage when the output of the fuel cell is stable.

15. The control method of claim 13, wherein the restricting of the output current comprises:
    restricting the output current of the fuel cell to not more than the first restriction current again when the demanded current or the output current of the fuel cell continues at not more than a stable current obtained by applying a factor of less than 1 to the second restriction current for at least a preset period of time when the output current of the fuel cell is restricted to not more than the second restriction current.

* * * * *